United States Patent
Quinlan et al.

(10) Patent No.: US 10,433,386 B2
(45) Date of Patent: *Oct. 1, 2019

(54) TRACKING AND LIGHTING SYSTEMS AND METHODS FOR A VEHICLE

(71) Applicant: J.W. SPEAKER CORPORATION, Germantown, WI (US)

(72) Inventors: Charissa Quinlan, Mayville, WI (US); Bradley William Kay, Mequon, WI (US)

(73) Assignee: J.W. SPEAKER CORPORATION, Germantown, WI (US)

(*) Notice: Subject to any disclaimer, the term of this patent is extended or adjusted under 35 U.S.C. 154(b) by 6 days.

This patent is subject to a terminal disclaimer.

(21) Appl. No.: 15/643,990

(22) Filed: Jul. 7, 2017

(65) Prior Publication Data

US 2017/0311406 A1 Oct. 26, 2017

Related U.S. Application Data

(63) Continuation of application No. PCT/US2016/012870, filed on Jan. 11, 2016.
(Continued)

(51) Int. Cl.
*H05B 33/08* (2006.01)
*B66F 9/06* (2006.01)
(Continued)

(52) U.S. Cl.
CPC ....... *H05B 33/0854* (2013.01); *B60Q 1/0023* (2013.01); *B60Q 1/24* (2013.01);
(Continued)

(58) Field of Classification Search
CPC ............ H05B 37/0272; H05B 37/0218; H05B 33/0854; F21Y 2115/10; F21Y 2115/00;
(Continued)

(56) References Cited

U.S. PATENT DOCUMENTS

| 3,934,134 A | 1/1976 | Wassel |
| 4,224,657 A | 9/1980 | Olson |

(Continued)

FOREIGN PATENT DOCUMENTS

| DE | 102012006333 A1 | 10/2013 |
| DE | 202013105012 U1 | 11/2014 |

(Continued)

OTHER PUBLICATIONS

PCT International Search Report and Written Opinion, PCT/US2016/012870, dated Apr. 14, 2016, 13 pages.

*Primary Examiner* — Douglas W Owens
*Assistant Examiner* — Amy X Yang
(74) *Attorney, Agent, or Firm* — Quarles & Brady LLP

(57) ABSTRACT

Systems and methods for illuminating and tracking a work area (21) is provided. Systems can include at least one lamp (14) to couple to an object, the at least one lamp (14, 24) to illuminate the work area (21), and a height module (50), the height module (50) in communication with the at least one lamp (14, 24) to provide an indication of a height of the work area. Methods can include the steps of determining a height data of the movable portion of the vehicle to be illuminated; communicating the determined height data of the movable portion to a stationary lamp (14, 24), the lamp including a microprocessor and plurality of light sources (20), each light source (20) controllable to illuminate an area at a predetermined height; and illuminating at least one of the plurality of light sources to correspond to the determined height data to illuminate the movable portion.

20 Claims, 14 Drawing Sheets

Related U.S. Application Data

(60) Provisional application No. 62/101,730, filed on Jan. 9, 2015.

(51) Int. Cl.
*H05B 37/02* (2006.01)
*B60Q 1/00* (2006.01)
*B60Q 1/24* (2006.01)
*B66F 9/075* (2006.01)
*F21S 9/02* (2006.01)
*F21V 5/04* (2006.01)
*F21V 21/14* (2006.01)
*F21Y 115/00* (2016.01)

(52) U.S. Cl.
CPC ........ *B66F 9/0755* (2013.01); *B66F 9/07504* (2013.01); *F21S 9/02* (2013.01); *F21V 5/04* (2013.01); *F21V 21/14* (2013.01); *H05B 37/0218* (2013.01); *H05B 37/0227* (2013.01); *H05B 37/0272* (2013.01); *B60Q 2900/30* (2013.01); *F21Y 2115/00* (2016.08)

(58) Field of Classification Search
CPC .. F21V 5/04; F21V 21/00; F21V 21/14; F21S 9/02; B60Q 1/24; B60Q 1/0023; B60Q 2900/03
USPC ................................ 315/76–77, 80
See application file for complete search history.

(56) References Cited

U.S. PATENT DOCUMENTS

| | | | | |
|---|---|---|---|---|
| 5,684,698 | A * | 11/1997 | Fujii | B60G 17/018 180/41 |
| 5,793,491 | A * | 8/1998 | Wangler | G01S 7/4802 356/398 |
| 5,995,001 | A | 11/1999 | Wellman et al. | |
| 6,411,210 | B1 * | 6/2002 | Sower | B66F 9/0755 250/491.1 |
| 7,016,765 | B2 | 3/2006 | Bellchambers | |
| 7,422,408 | B2 | 9/2008 | Sobota et al. | |
| 9,623,794 | B2 * | 4/2017 | Quinlan | B60Q 1/24 |
| 2002/0089668 | A1 | 7/2002 | Kokura | |
| 2010/0296285 | A1 * | 11/2010 | Chemel | F21S 2/005 362/235 |
| 2011/0286007 | A1 | 11/2011 | Pangrazio et al. | |
| 2012/0060383 | A1 * | 3/2012 | Goddard | B66F 9/0755 33/228 |
| 2013/0182237 | A1 | 7/2013 | Viereck et al. | |
| 2014/0132406 | A1 | 5/2014 | Lantz et al. | |
| 2014/0159881 | A1 | 6/2014 | Adami | |
| 2014/0225509 | A1 * | 8/2014 | Wiegel | F21V 21/26 315/129 |
| 2015/0035437 | A1 | 2/2015 | Panopoulos et al. | |

FOREIGN PATENT DOCUMENTS

| | | |
|---|---|---|
| EP | 1205428 A1 | 5/2002 |
| EP | 2746105 A1 | 6/2014 |
| JP | 2001206684 A | 7/2001 |

* cited by examiner

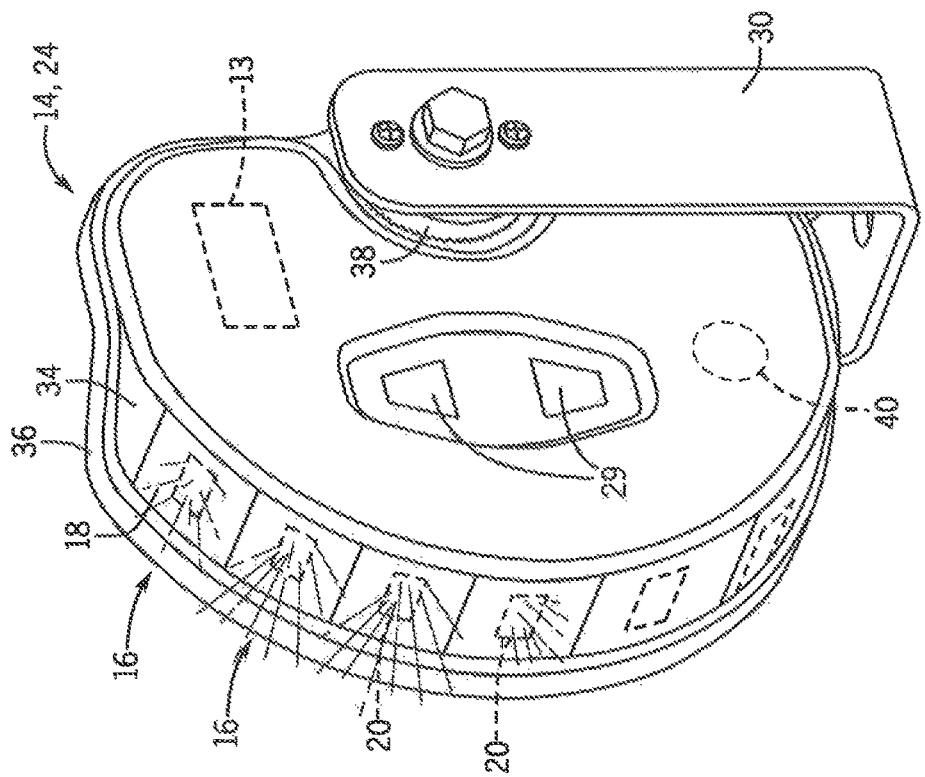
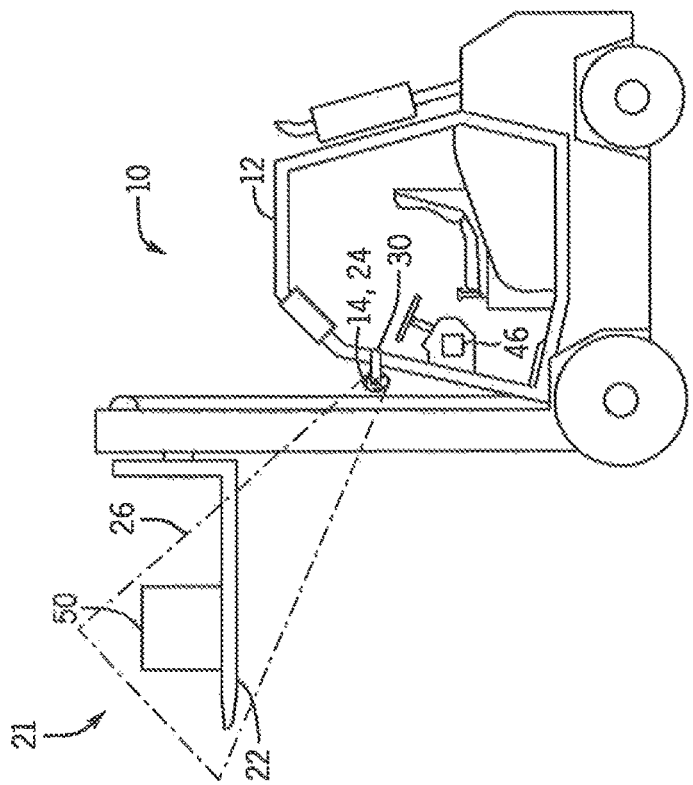

| HEIGHT BIN | LED 1 OUTPUT | LED 2 OUTPUT | LED 3 OUTPUT | LED 4 OUTPUT | LED 5 OUTPUT | LED 6 OUTPUT |
|---|---|---|---|---|---|---|
| 0.0 | 100% | 100% | 0% | 0% | 0% | 0% |
| 0.5 | 50% | 100% | 50% | 0% | 0% | 0% |
| 1.0 | 0% | 100% | 100% | 0% | 0% | 0% |
| 1.5 | 0% | 50% | 100% | 50% | 0% | 0% |
| 2.0 | 0% | 0% | 100% | 100% | 0% | 0% |
| 2.5 | 0% | 0% | 50% | 100% | 50% | 0% |
| 3.0 | 0% | 0% | 0% | 100% | 100% | 0% |
| 3.5 | 0% | 0% | 0% | 50% | 100% | 50% |
| 4.0 | 0% | 0% | 0% | 0% | 100% | 100% |
| 4.5 | 0% | 0% | 0% | 0% | 50% | 100% |
| 5.0 | 0% | 0% | 0% | 0% | 0% | 100% |

FIG. 12

| FUNCTION | LED 1 OUTPUT | LED 2 OUTPUT | LED 3 OUTPUT | LED 4 OUTPUT | LED 5 OUTPUT | LED 6 OUTPUT |
|---|---|---|---|---|---|---|
| LOWER BEAM | 100% | 100% | 0% | 0% | 0% | 0% |
| ALL ON | 100% | 100% | 100% | 100% | 100% | 100% |

FIG. 17

TRACKING AND LIGHTING SYSTEMS AND METHODS FOR A VEHICLE

CROSS-REFERENCE TO RELATED APPLICATIONS

This application is a Continuation of PCT International Application No. PCT/US2016/012870 filed Jan. 11, 2016, which claims priority to U.S. Provisional Patent Application Ser. No. 62/101,730, filed Jan. 9, 2015, all of which are hereby incorporated by reference for all purposes.

FIELD OF THE INVENTION

The present invention relates to area lighting. More particularly, the invention relates to systems and methods for illuminating a work area using lighting systems.

BACKGROUND

Lifts, elevators, conveyors, and material handling vehicles, such as forklifts, front-end loaders, excavators, and back hoes, are used to transport a material from point A to point B. Throughout the operation of this equipment, the material, for example a pallet or unearthed land, changes position as a portion of the material handling vehicle, for example the forks or the shovel, changes position.

In some situations, an operator of the equipment or material handling vehicle may not have a desired view of the material or of the work area. For example, in a dark environment, headlights of a front-end loader may light a path only directly in front of the vehicle; however the shovel and material itself do not have an illumination system, nor is the material illuminated as the material changes position. In an alternative situation, a material handling vehicle may be an automated vehicle, with no human control. It may be desirable for a supervisor to observe the operation of the automated vehicle.

Therefore, what is needed are improved systems and methods that illuminate a desired work area.

SUMMARY OF THE INVENTION

The present invention provides illumination and tracking systems and methods for a work area. The invention provides systems and methods that can illuminate a work area, such as for equipment or a vehicle as the work area changes or has changed position. The systems and methods can manually or automatically control a light beam pattern of a stationary light source or sources by determining a distance between two objects via sensors. As one non-limiting example that will be used throughout the description, one example of use is to track and determine the height of a forklift carriage while automatically adjusting the illumination pattern of the light source(s) to keep the forklift carriage illuminated. It is to be appreciated that other applications where adjusting a light pattern to move with an object or equipment, for example, would be beneficial.

In one form, the invention provides a system for lighting a vehicle work area. The system can include at least one lamp coupled to the vehicle, the at least one lamp positioned to illuminate the vehicle work area, and a height module coupled to a movable element of the vehicle, the movable element associated with the vehicle work area and controllable by the vehicle operator to increase and decrease in height relative to the vehicle, the height module in communication with the at least one lamp to provide height data of the movable element to the lamp to illuminate the vehicle work area as the movable element moves up and down.

In another form, the invention provides a method of illuminating a movable portion of a vehicle. The method can comprise the steps of: determining a height data of the movable portion of the vehicle to be illuminated; communicating the determined height data of the movable portion to a stationary lamp, the lamp including a microprocessor and plurality of light sources, each light source controllable to illuminate an area at a predetermined height; and illuminating at least one of the plurality of light sources to correspond to the determined height data to illuminate the movable portion.

In yet another form, the invention provides a system for lighting a work area. The system can comprise at least one lamp to couple to an object, the at least one lamp to illuminate the work area, and a height module, the height module in communication with the at least one lamp to provide an indication of a height of the work area.

In yet another form, the invention provides a method of illuminating a work area. The method can comprise the steps of: providing a lamp for illuminating the work area, the lamp including a lamp controller, a lamp power supply, a lamp wireless module, and a plurality of light sources, each light source being independently controllable by the lamp controller; and providing a height module for determining height data of the work area, the height module including a height module controller, a height module power supply, a height module wireless module, a height module sensor for determining height data, and a height module sensor for determining movement of the height module.

In still yet another form, the invention provides a lighting system. The lighting system can comprise a lamp to illuminate a work area, the lamp including a lamp controller, a lamp power supply, a lamp wireless module, and a plurality of light sources, each light source being independently controllable by the lamp controller, and a height module to determine height data of the work area, the height module including a height module controller, a height module power supply, a height module wireless module, a height module sensor to determine height data, and a height module sensor to determine movement of the height module, the height module to wirelessly communicate the height data to the lamp.

These and other features, aspects, and advantages of the present invention will become better understood upon consideration of the following detailed description, drawings and appended claims.

BRIEF DESCRIPTION OF THE DRAWINGS

FIG. 5 is yet an additional view of the vehicle using a lighting system to illuminate a work area, and showing an adjusted light pattern.

FIG. 6 is yet an additional view of the lighting system usable to illuminate the vehicle work area, and showing an adjusted light pattern.

FIG. 12 is a table showing exemplary illumination patterns.

FIG. 17 is a table showing exemplary illumination patterns.

DETAILED DESCRIPTION OF THE PREFERRED EMBODIMENT

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising." or "having" and variations thereof herein is meant to encompass the items listed thereafter and equivalents thereof as well as additional items. Likewise, "at least one of A, B, and C," and the like, is meant to indicate A, or B, or C, or any combination of A, B, and/or C. Unless specified or limited otherwise, the terms "mounted," "secured," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 2:
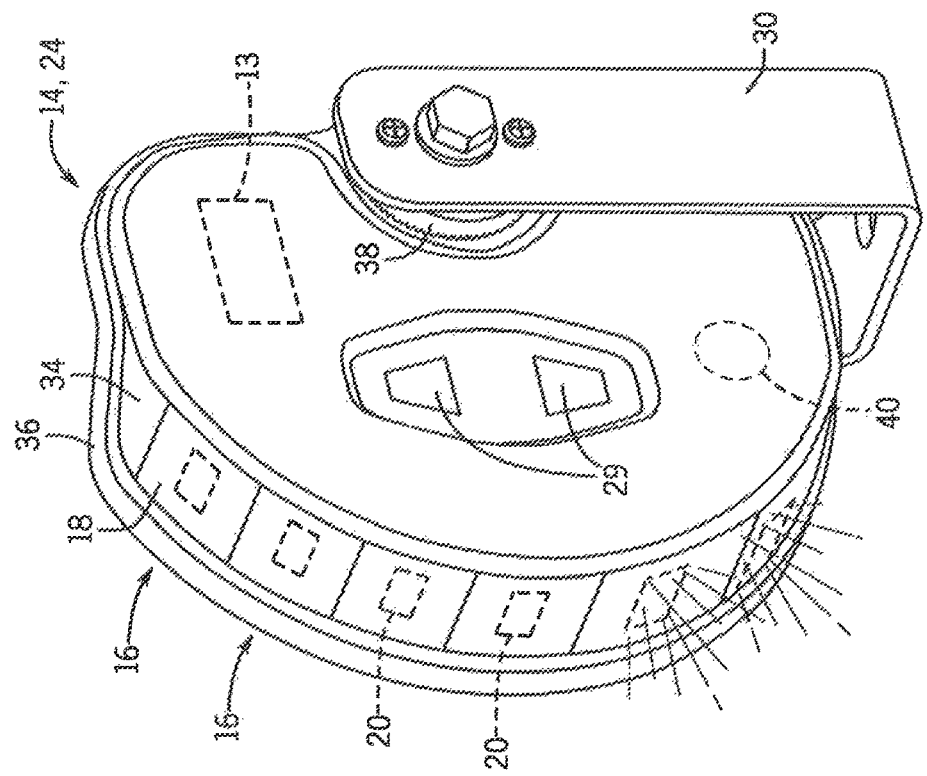
FIG. 2 is an embodiment of the lighting system usable to illuminate the vehicle work area.

Referring to FIGS. 1-6, a lighting system 10 for illuminating a work area 21, such as the work area of a vehicle 12, is shown. The lighting system 10 can include at least one lamp 14. The lamp 14 can be coupled to equipment, such as the vehicle 12 as a non-limiting example. As can be seen in FIG. 2, the lamp 14 can have a plurality of independently operable optical systems 16. Six optical systems are shown, but it is to be appreciated that more than six or less than six optical systems can be used depending on any particular application. In some embodiments, two or three light sources 20 (or more or less) can be illuminated at any given time depending on the position of the work area 21 and any desired illumination. Each of the optical systems 16 can have a reflector optic 18 to guide light from a light source 20, for example an LED. It is possible for the reflector optics 18 to be curved to provide a desired range of reflection both horizontally and vertically.

A bracket 30 can be used to couple the lamp 14, e.g., to a vehicle 12, or other support structure, such as a post or rack, for example. The lamp 14 can be rotated about the bracket 30 at pivot 38. The lamp 14 can include a lens 34 and a housing 36. The lens 34 can include an arcuate face and can be made of transparent or semi-transparent polycarbonate or other known materials providing good impact resistance. In some embodiments, the lens can have 50 percent transparency or 75 percent transparency, or 90 percent transparency, or 100 percent transparency, as non-limiting examples.

In one example embodiment, six curved reflector optics 18 can provide for an optical distribution range of nearly +/−80 degrees vertically and +/−30 degrees horizontally, although other optical ranges are contemplated, such as +/−180 degrees vertically and/or horizontally, or more or less. These optical systems 16 can be used to generate a light pattern 26 that can use a combination of intensities from different light sources to blend the light in the area around the vehicle 12, for example a forklift, front-end loader, excavator, or a backhoe, as non-limiting examples. It is possible for a microprocessor 13 to be included in the lamp 14. For example, the microprocessor 13 can allow for the desired light pattern to be achieved, among other operations. The optical intensity of each optical system 16 can be independently controlled by the microprocessor 13, such that no mechanical movement of the lamp 14 is needed to obtain movement of various light patterns 26 (see FIGS. 1, 3, 5 for example).

Figure 1:
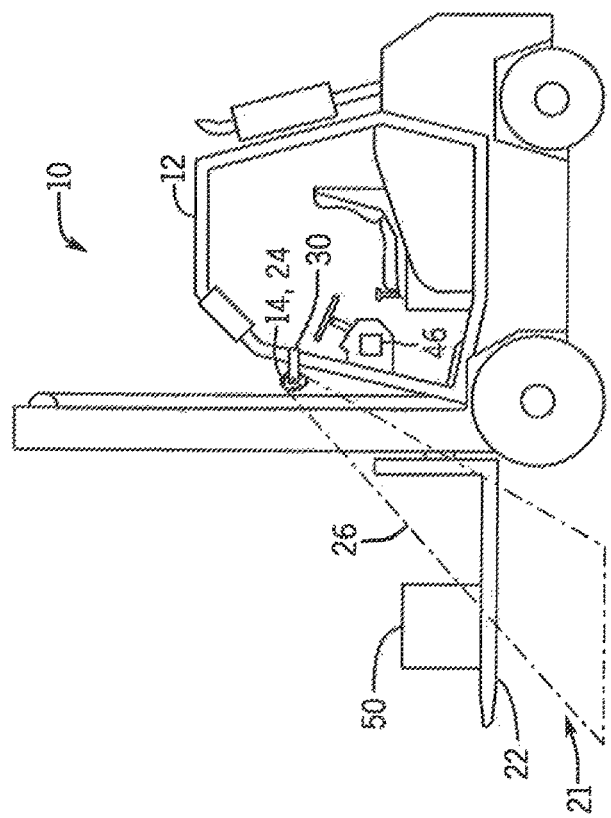
FIG. 1 is a view of a vehicle using a lighting system to illuminate a work area.
Figure 4:
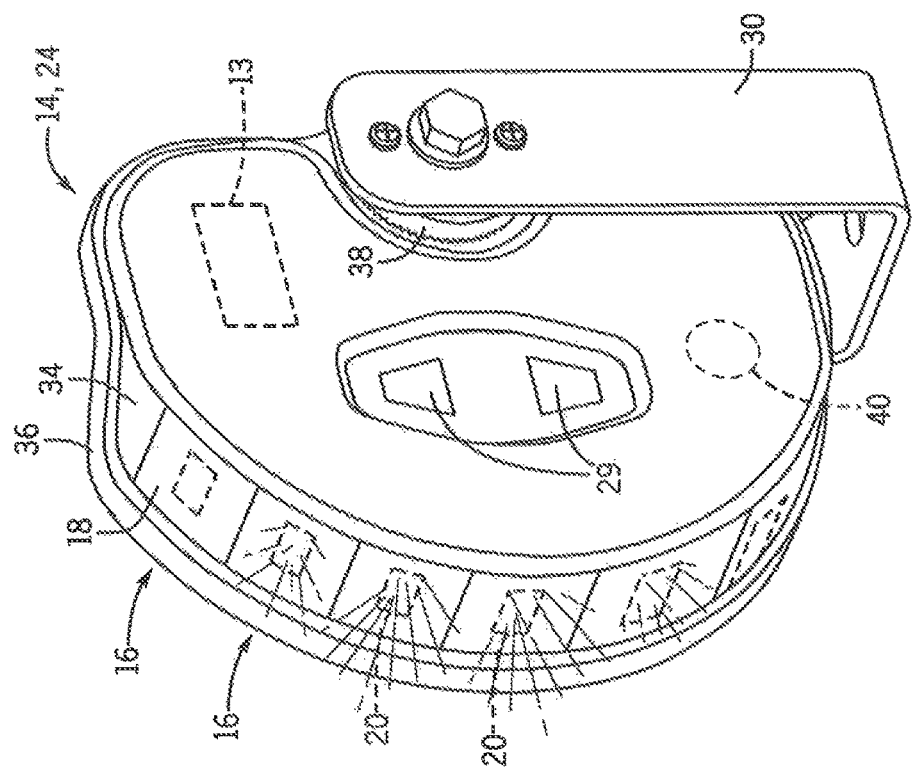
FIG. 4 is an additional view of the lighting system usable to illuminate the vehicle work area, and showing an adjusted light pattern.

In one example shown in FIG. 1, the light pattern 26 can be used to illuminate a work area 21, such as a movable portion including a forklift carriage 22. However, the light patterns can be used to illuminate any desired work area, or any portion of any vehicle 12, especially portions that move. In some embodiments, a height module 50, which will be described in more detail below, can be included to determine the height of a movable object in the work area 21, e.g., the forklift carriage 22.

The lamp 14, for example, can be a master lamp 14 that receives data detailing the height of the forklift carriage 22. The master lamp 14 can calculate a new light pattern 26 and may transmit the new light pattern information to change the light pattern 26 of the master lamp 14. One or more slave lamps 24 can also be included if more illumination is needed or desired. A slave lamp 24 can wirelessly, or wired, receive the new light pattern 26 information and can change the light pattern 26 of the slave lamp 24. It is also possible for a slave lamp 24 to cue a change in the light pattern 26 of the master lamp 14. For example, if a user manually changes the light pattern 26 of the slave lamp 24 using an override remote control 28 or illumination control 29 as further described below, data related to this change can be transmitted to the master lamp 14. The master lamp can receive this data, and the light pattern 26 of the master lamp 14 can be altered to reflect the change made by the slave lamp.

In some embodiments, the override remote control 28 can include at least one button 33 to move the light pattern 26 of at least one of the slave lamps 24 and the master lamp 14 in the direction indicated by the override remote control 28.

Figure 3:
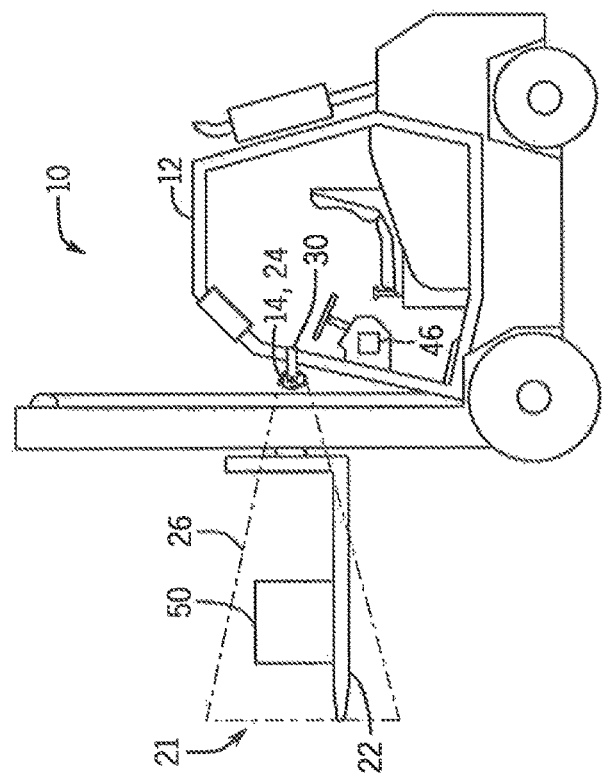
FIG. 3 is an additional view of the vehicle using a lighting system to illuminate a work area, and showing an adjusted light pattern.
Figure 7:
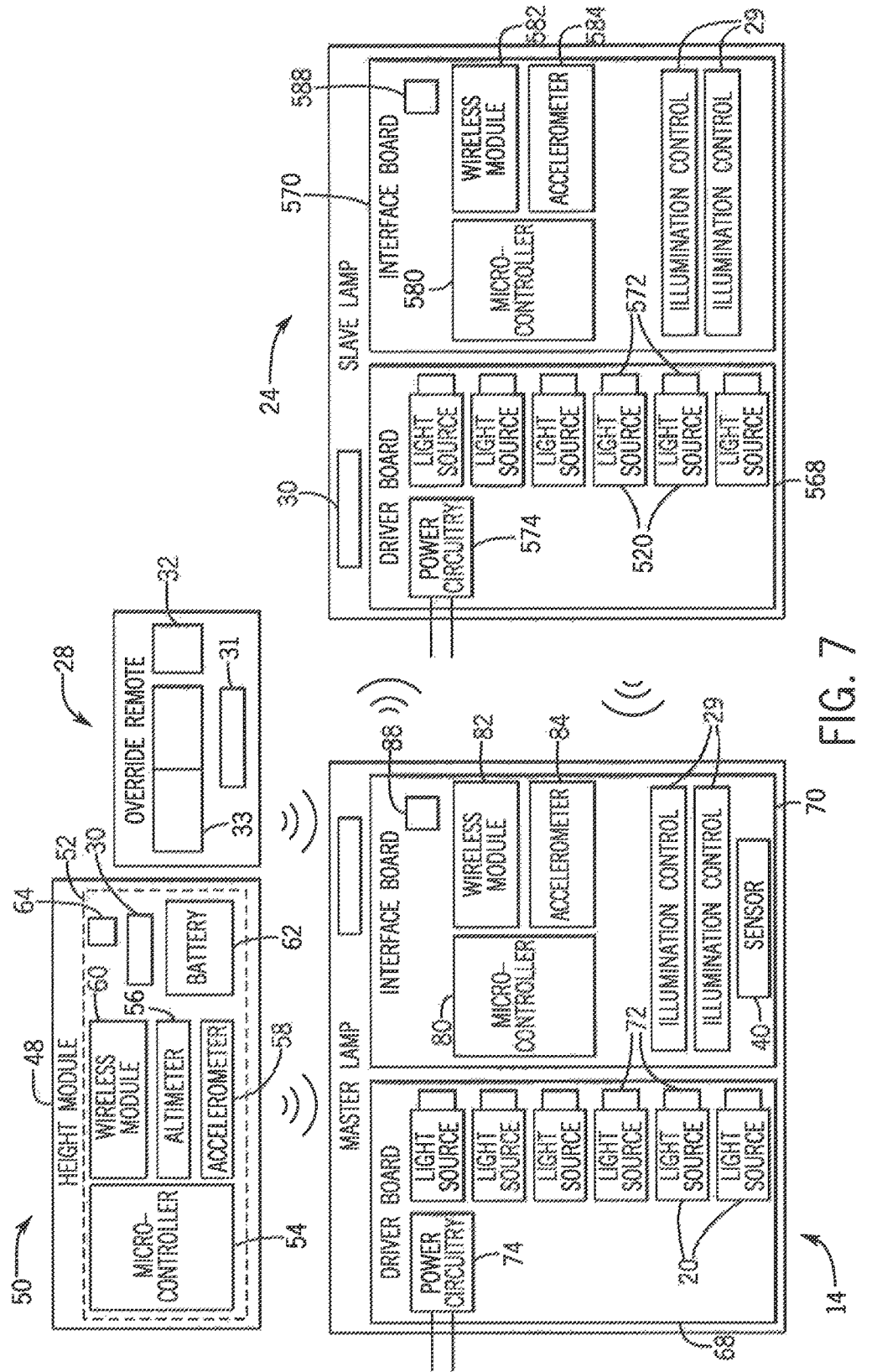
FIG. 7 is a schematic of a height module, an override remote control, a master lamp, and a slave lamp usable in the lighting system.

As the work area moves, at least one of the light sources 20 can be illuminated at any given time depending on the height of the work area 21, e.g., a movable portion such as the forklift carriage 22, so as to allow the illumination pattern 26 to generally follow and illuminate the work area 21 all while the master lamp 14 remains stationary. As can be seen in the examples shown in FIGS. 2, 4, and 6, a plurality of sources 20 can be illuminated. It is possible for the light sources 20 to illuminate at variable intensities (see FIGS. 4 and 6 for example). During operation, the intensity the light sources 20 can vary throughout the light pattern's execution, e.g., as the light pattern 26 moves to illuminate a moving work area 21. As seen in the examples of FIGS. 1, 3, and 5, as a position of the forklift carriage 22 is moved, a varied one or more, e.g., a plurality, of light sources 20 can be illuminated to illuminate the forklift carriage 22 as the carriage moves. It is to be appreciated that the light pattern 26 can be controlled to illuminate any particular object or area, and is not limited to illuminating a forklift carriage. The varying intensities can cause a change in the illumination pattern to appear smooth, rather than stepwise as it would appear in conventional digital applications. It is to be appreciated that stepwise illumination can also be performed:

As shown in FIG. 7, it is possible for any of the height module 50, the master lamp 14, the slave lamp 24, and the override remote control 28 to be outfitted with wireless transceivers 60, 82, 582 in at least one of a transmit mode and a receive-transmit mode. In some embodiments, the light pattern 26 of the slave lamp 24 cannot be changed manually. The slave lamp 24 therefore may not transmit data to the master lamp 14, and the wireless transceiver 582 can be outfitted in only the receive mode, or the wireless transceiver may be replaced with a wireless receiver. The height module 50 and the override remote control 28 may be primarily transmitters, broadcasting information to any receiving module. The master lamp 14 and the slave lamp 24 can be receiving modules, receiving the wireless transmissions that are broadcast, and filtering the transmissions to include only the desired transmissions. Each wireless transceiver 60, 82, 582 can have a permanent unique identifying electronic signature that it broadcasts with each transmission of data. In some embodiments, the receiving modules will not pass transmission data to the microprocessor 13 if the receiving module has not learned the electronic signature for a corresponding transmitting device. In this way, multiple systems will not interfere with each other if they are being used in a surrounding location within a communication range.

To determine the height of any desired object or work area 21, e.g., the forklift carriage 22, the system may also include the height module 50, which may be coupled to any desired object, e.g., the forklift carriage 22. In one embodiment, the height module 50 can be mounted to the forklift carriage 22. In another embodiment, the height module 50 can include a magnet or can be in a magnetic housing 48 to magnetically couple to a desired object. In some embodiments, the height module 50 can be placed in or on a work area 21 that changes in height. As shown in FIG. 7, the height module 50 can have a carriage printed circuit board (PCB) 52, which can include a microprocessor 54, a sensor 56 to determine height related data, for example an altitude sensor, a sensor 58 to determine motion related data, for example an accelerometer 58, a wireless transceiver 60, a power supply 62, for example at least one battery, and optional circuitry 64. The carriage PCB 52 can execute an algorithm that can use data from the altitude sensor 56 to determine a current altitude of the carriage PCB 52 and can broadcast the current altitude via the wireless transceiver 60.

It is also possible for additional sensors, a combination of sensors, or other systems to be used to provide data to determine the height of any desired object or work area 21, e.g., the forklift carriage 22. For example, the height of the forklift carriage 22 can be determined through use of laser diodes, ultrasonic sonar, pressure sensors, a string potentiometer or any other acceptable technologies or methods of calculation, including for example time-of-flight, etc. It is possible for light or sound or other mediums to be used when calculating time-of-flight. In addition, the data gathered by the sensors or other systems may be transmitted either via a wired or wireless communication protocol between microprocessors.

Figure 8:
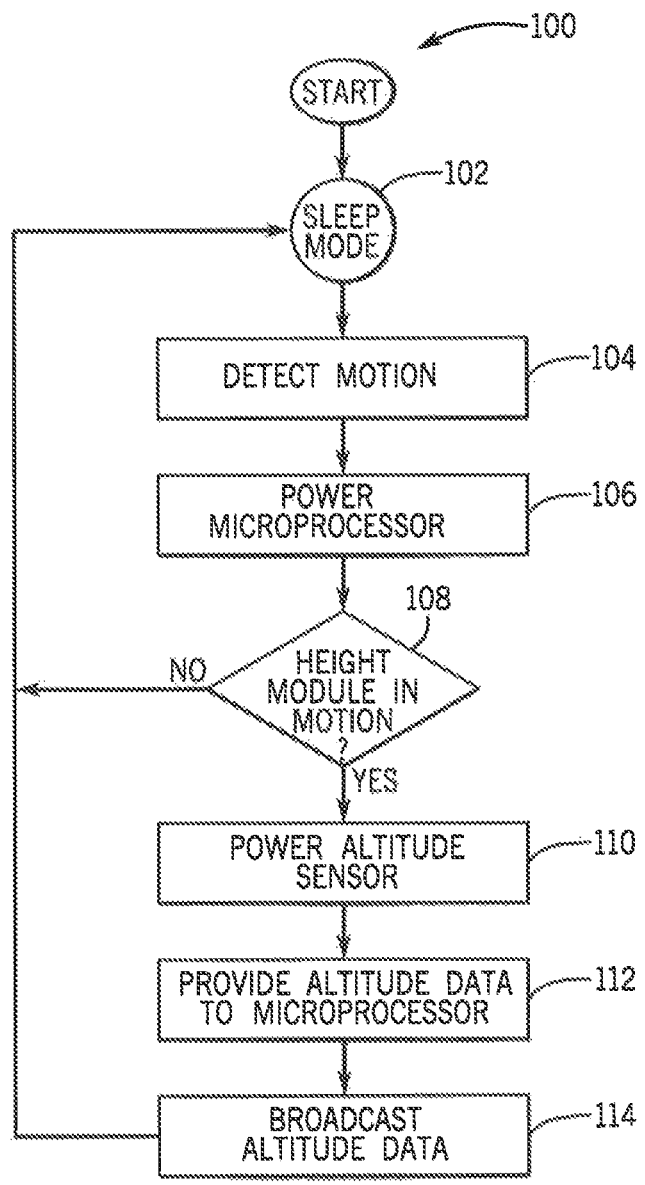
FIG. 8 is a process flow chart for the operation of a printed circuit board (PCB) usable for the height module.

An exemplary flowchart 100 for the operation of the carriage PCB 52 may be seen in FIG. 8. In some embodiments, the PCB 52 can be energy conservative, as it monitors motion of any desired object or work area 21, e.g., the forklift carriage 22 in the x, y, and z axes via the accelerometer 58 and can cause any of the microprocessor 54, wireless transceiver 60, and altitude sensor 56 to enter a sleep mode as shown in step 102, in which minimal or no power is delivered from the power supply 62. The sleep mode can conserve power if there is no motion detected above a given threshold. For example, the sleep mode can be entered if no motion is detected after one second, or one minute, or ten minutes, or one hour, as non-limiting examples. If the accelerometer 58 detects a motion event above the threshold as shown in step 104, delivery of power to the microprocessor can be restored as seen in step 106, allowing the microprocessor to determine if the height module 50 is in motion, as seen in step 108. At step 108, if the height module 50 is in motion, power to the sensor 56, e.g., an altitude sensor, can be restored as seen in step 110, allowing the altitude sensor 56 to begin providing altitude data to the microprocessor, which can then broadcast the altitude data, as shown in steps 112 and 114 respectively. After the altitude sensor 56 has provided the altitude data to the microprocessor and the microprocessor has transmitted the altitude data, the microprocessor, wireless transceiver 60, and accelerometer 58 can enter the sleep mode as shown in step 102 to conserve battery power until additional motion is detected.

Referring again to FIG. 7, the master lamp 14 can receive messages from any of the height module 50, the override remote control 28, and the slave lamp 24, and can include at least one of a driver PCB 68 and an interface PCB 70. It is to be appreciated that the driver PCB 68 and the interface PCB 70 can be combined into one or more PCBs. The driver PCB 68 and interface PCB 70 can be within the master lamp 14. The driver PCB 68 can contain circuitry 74 to increase or decrease the voltage level for the components on the interface PCB 70 and the driver PCB 68, and also can contain the light sources 20 and the corresponding light source drivers 72. The interface PCB 70 can contain a microprocessor 80, a wireless transceiver 82, an accelerometer 84, and at least one illumination control means 29, along with the circuitry 88 to enable function of these components. The at least one illumination control means 29 can be accessible on the master lamp 14 to manually adjust the light pattern 26. In some embodiments, the illumination control means can be a capacitive touch integrated circuit chip to allow a user to simply touch the portion of the lens 34 associated with the capacitive touch integrated circuit chip to adjust the position of the light pattern 26. In other embodiments, the illumination control means 29 can be buttons or slides or adjustment wheels, all as non-limiting examples.

In some embodiments, the illumination control means 29 includes two buttons, one for an increase in the light pattern 26 and one for a decrease in the light pattern 26. In some embodiments, if both buttons are selected simultaneously for a given time period, it can activate a learning function that allows the master lamp's wireless transceiver 82 to learn the unique signature of other wireless modules.

The wireless transceiver 82 can receive broadcasted signals, and can filter the signals to include those with electronic signatures that the wireless transceiver 82 has learned. The signals with electronic signatures known by the wireless transceiver 82 can be transmitted to the microprocessor 80. The microprocessor 80 can receive and decode signals to determine if the signal was received from the height module 50, the override remote control 28, or the slave lamp 24.

Figure 9:
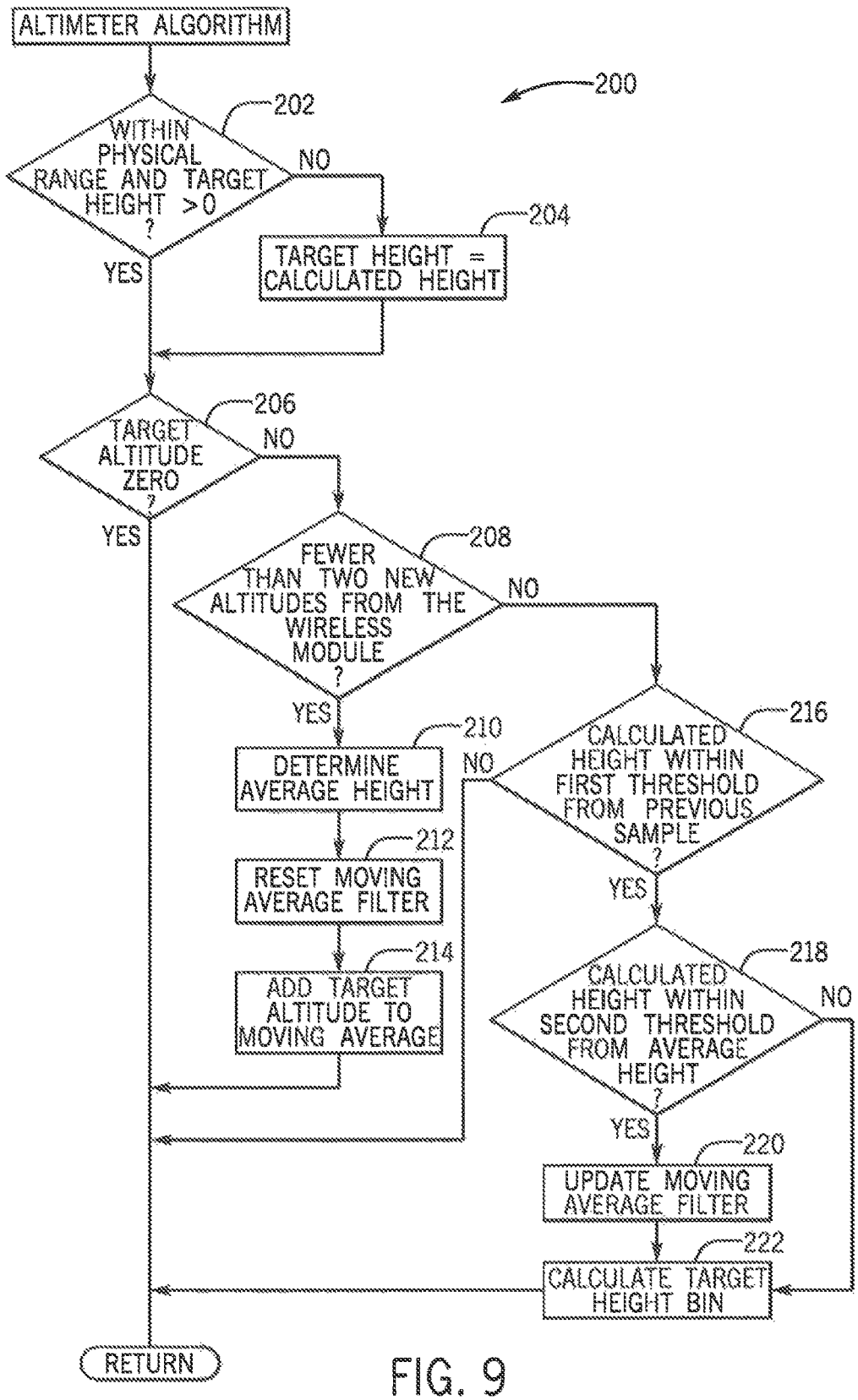
FIG. 9 is a process flow chart for an altitude algorithm usable to determine the height of an object or work area.

In one example, the signal received by the microprocessor 80 can be received from the height module 50. The height of any desired object or work area 21, e.g., the forklift carriage 22, can be determined mathematically from the signal data, and the calculated carriage height can be relayed to an exemplary altitude algorithm 200 shown in FIG. 9. The altitude algorithm 200 can determine which light sources 20 should be illuminated, given the calculated carriage height received from the height module 50. To do so, the altitude algorithm 200 can determine if the calculated carriage height is within a physical range of the desired object or work area 21, e.g., forklift carriage 22, and if a target height is greater than zero as shown in step 202. If these conditions are not met, the calculated carriage height can be assigned to the target height as shown in step 204. If, however, the target height is determined to be zero as shown in step 206, the altitude algorithm 200 can exit as a desirable reference datum cannot be obtained.

If it is determined that there have been fewer than two calculated carriage heights as shown in step 208, an average height can be determined by averaging two datum points as shown in step 210. The target height can be used as one datum point; the other datum point can be determined by subtracting a lower threshold of a target height bin from the target height bin, such that the average height can be lower than the target height bin by a desired amount. As can be seen in step 212, a moving average filter can be reset to reflect the newly calculated average height. The target altitude can be added to the moving average filter as seen in step 214.

The height bins used to determine the average are comprised of ranges of values, the values detailing the difference in height between the averaged height and the calculated carriage height. For example, if the difference between the average height and the calculated carriage height is less than three feet, the height difference between the height module 50 and the ground is less than three feet. This example would cause the algorithm to report a target height bin corresponding to light sources illuminating a work area approximately three feet above the ground. The target height bin can be calculated, by the master lamp 14 for example, each time there is a new altitude received from the altitude sensor 56.

When at least two carriage heights have been calculated as determined in step 208, the target height bin can be adjusted when there is a new calculated carriage height that is within a threshold as seen in step 216, for example six inches, from the previous sample and within a second threshold as seen in step 218, for example, one foot, of the overall average height. This ensures that the samples added to the average height are those collected when the work area 21 is approximately at its lowest level. If the calculated carriage height is within both the first and second thresholds, the moving average filter can be updated and a new target height bin can be calculated, as seen in steps 220 and 222 respectively. The average height can also adjust to reflect atmospheric pressure changes as the algorithm operates. The average height can be erased and reset if the system is power cycled, a reset message from the remote is received, or if one of the buttons 29 are pressed, for example. When the average height is erased and reset, the altitude algorithm can begin adding valid samples to the average as previously described.

Figure 10:
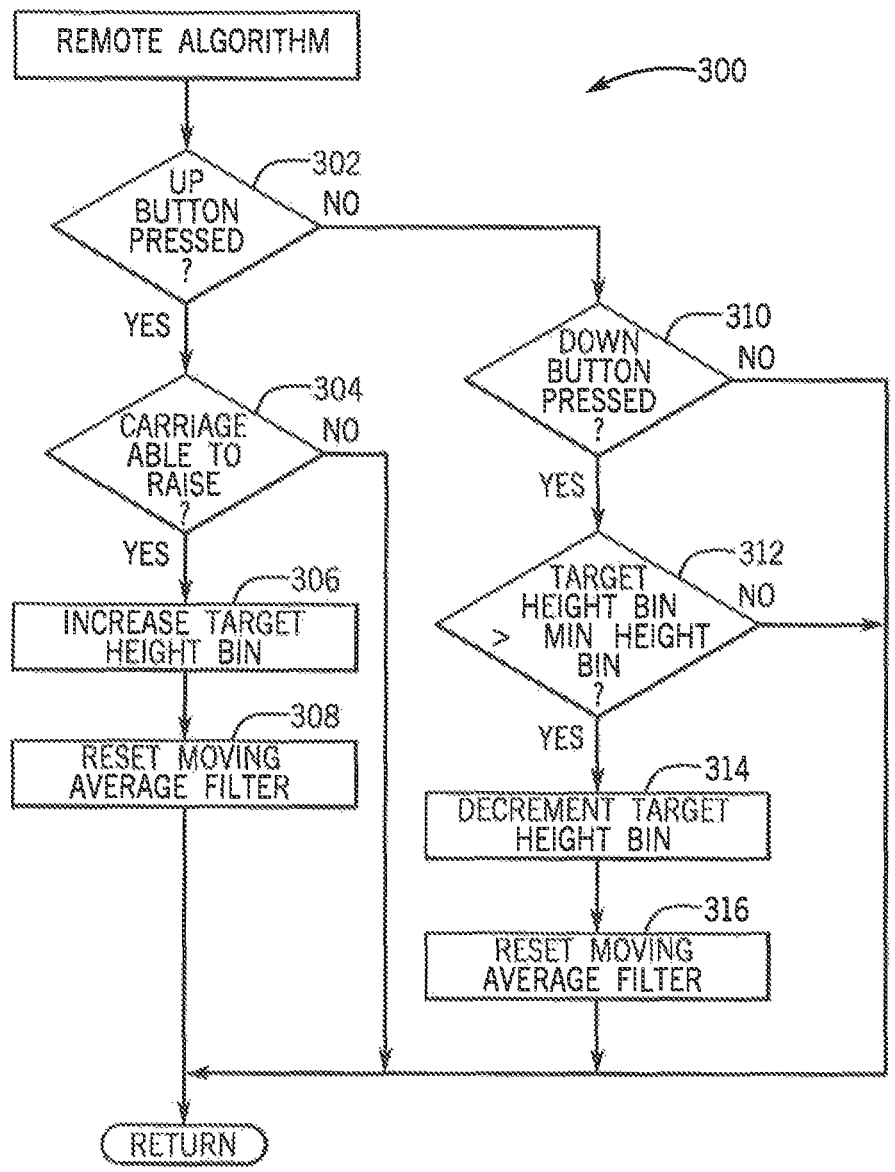
FIG. 10 is a process flow chart for the determination of an illumination pattern when the override remote control has been used.

An exemplary remote algorithm 300, shown in FIG. 10, can be activated when the microprocessor 80 determines that a message was received from the override remote control 28. If the button 33 corresponding to upward motion was pressed as determined in step 302, the microprocessor 80 can determine whether the light pattern is at its maximum height. If it is not at its maximum height, the microprocessor 80 can increase the target height bin and reset the moving average filter to achieve a different light pattern as seen in steps 306 and 308 respectively. Similarly, if the button 33 corresponding to downward motion was pressed as determined in step 310, the microprocessor 80 can determine whether the light pattern is at its maximum height. If it is not at its maximum height, the microprocessor 80 can decrease the target height bin and reset the moving average filter to achieve a different light pattern as seen in steps 314 and 316 respectively. If the light pattern is at its maximum or minimum value so they cannot be increased or decreased respectively, the algorithm can exit. This process can allow for the light pattern to be altered by a user when the work area is stationary, for example, or a varied or repositioned light pattern 26 is desired.

Figure 11:
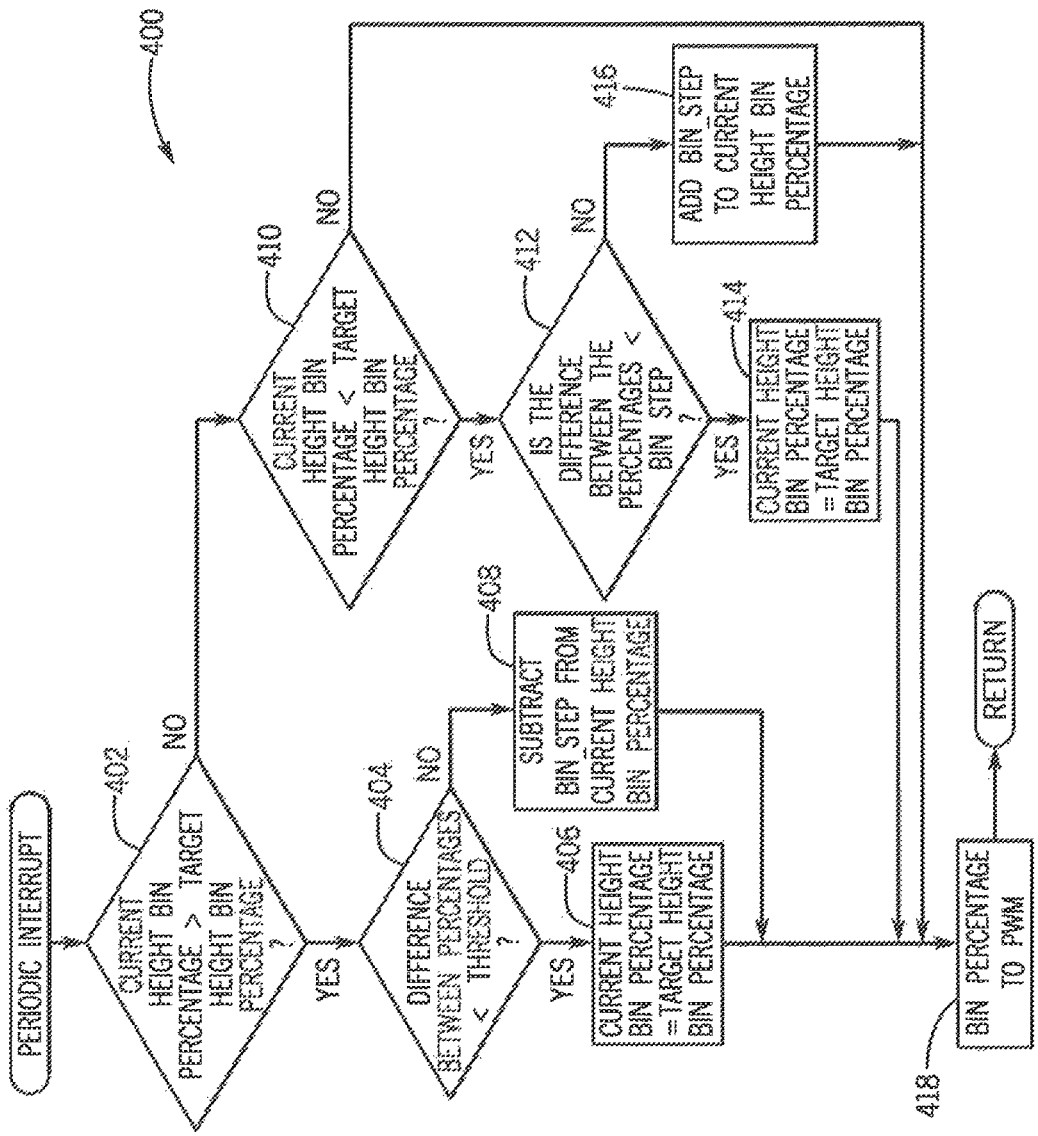
FIG. 11 is a process flow chart for a periodic interrupt usable to stabilize a value of a current height bin.

In some embodiments, periodically, an interrupt can execute at a set time interval. In some embodiments, the interrupt can be user programmable. An exemplary interrupt process flow 400 is shown in FIG. 11. In this interrupt routine, a floating point current height bin percentage can be incremented or decremented by a defined amount, trying to equal the target height bin. The height bins can be referred to as percentages because they can be floating point numbers that represent the whole number height bin and the fractional duty cycle percentage used by a light source pulse-width-modulation routine to adjust the brightness of each light source. As seen in step 402, it can be determined if the current height bin percentage is greater than a target height bin percentage. If the current height bin percentage is greater than a target height bin percentage, a difference between the percentages can be determined as seen in step 404. If the difference between the percentages is less than a threshold, the current height bin percentage can be set to equal the target height bin percentage, as seen in step 406. If the difference between the percentages is greater than the threshold, the threshold can be subtracted from the current height bin percentage as seen in step 408. Alternatively, as seen in step 410, it can be determined if the current height bin percentage is less than a target height bin percentage. If the current height bin percentage is less than a target height bin percentage, a difference between the percentages can be determined as seen in step 412. If the difference between the percentages is less than a threshold, the current height bin percentage can be set to equal the target height bin percentage, as seen in step 414. If the difference between the percentages is greater than the threshold, the threshold can be added to the current height bin percentage as seen in step 416.

After the current height bin percentage has been adjusted, a BinPercentageToPWM (BPTP) function can be called as seen in step 418. The BPTP function can decode the current height bin percentage, and can provide data used to cause the light sources to dim/brighten or turn on/off to generate the desired light pattern 26.

After the current height bin percentage is passed to the BPTP function, the current bin height percentage can be mathematically separated into its integer and decimal values, and the inverse of the decimal can be calculated. The integer value can be used to determine which light sources 20 will be dimmed or brightened through pulse width modulation (PWM) of the voltage supply to the light source, and which light sources 20 will be completely turned on or off.

In this example, a threshold can be preset equal to an electrical or optical equivalent of two light sources 20 fully illuminated at any given time. Therefore, two light sources 20 may be illuminated at 100 percent optical output or a first light source 20 illuminated at 100 percent optical output and two light sources 20 adjacent to the first light source 20 illuminated, with the sum of their optical outputs equaling 100 percent. Therefore, as one adjacent light source 20 is brightening, the second adjacent light source 20 can be dimming at the same rate.

As shown in the table of FIG. 12, an example pattern of six LED light sources 20 can be seen. The integer portion of the current height bin threshold (leftmost column) determines which LEDs will be illuminated at or near 100 percent output. The remaining LEDs can either not illuminate or be in a brightening/dimming state. It can be possible for a more flexible pattern to be created, by updating the decimal portion of the height bin at an increased frequency and creating a more accurate decimal. For example, if the height bin integer is one and the decimal portion is 0.01234567, LED 3 can be illuminated at 100 percent, LED 2 can be illuminated at 1.234567 percent PWM duty cycle (almost all the way on) and LED 4 can be illuminated at 98.765433 percent PWM duty cycle (100 percent minus 1.234567 percent), or almost all the way off. Having a nearly infinite quantity of possible height bin values that are updated very quickly (1000 times per second per a one millisecond interrupt, for example) can create a smooth, organic-feeling light pattern that can be both accurate and flexible.

It is possible for at least one slave lamp 24 to be added to the system to allow for additional illumination. Referring again to FIG. 7, the slave lamp(s) 24 can include identical or similar hardware to the master lamp 14, but can be dissimilar in firmware and execution. Therefore, the slave lamp 24 can include at least one of a driver PCB 568 and an interface PCB 570. It is to be appreciated that the driver PCB 568 and the interface PCB 570 can be combined into one or more PCBs. The driver PCB 568 and interface PCB 570 can be within the slave lamp 24. The driver PCB 568 can contain circuitry 574 to increase or decrease the voltage level for the components on the interface PCB 570 and the driver PCB 568, and can also contain the light sources 520 and the corresponding light source drivers 572. The interface PCB 570 can contain a microprocessor 580, a wireless transceiver 582, an accelerometer 584, and at least one illumination control means 29, along with the circuitry 588 to enable function of these components. The at least one illumination control means 29 can be accessible on the slave lamp 24 to manually adjust the light pattern 26. In some embodiments, the illumination control means can be a capacitive touch integrated circuit chip to allow a user to simply touch the portion of the lens 34 associated with the capacitive touch integrated circuit chip to adjust the position of the light pattern 26. In other embodiments, the illumination control means 29 can be buttons or slides or adjustment wheels, all as non-limiting examples.

While the master lamp 14 can handle the algorithms, the slave lamp(s) 24 can be responsible for adjusting a light pattern of the slave lamp 24 when the target height bin is received from the master lamp 14. This can allow for the master lamp 14 and slave lamps 24 to synchronize.

Turning still to FIG. 7, the slave lamp 24 can include a wireless transceiver 582 which can receive broadcasted signals, and can filter the signals to include those with electronic signatures that the wireless transceiver 582 has learned. The signals with electronic signatures known by the wireless transceiver 582 can be transmitted to the microprocessor 580. The microprocessor 580 can receive and decode signals to determine if the signal was received from the height module 50, the override remote control 28, or the master lamp 14. Signals from the master lamp 14 can be decoded to acquire the target height bin. Once the target height bin has been acquired, the intensity of the light source can be modified in an identical or similar manner to the master lamp 14.

Figure 13:
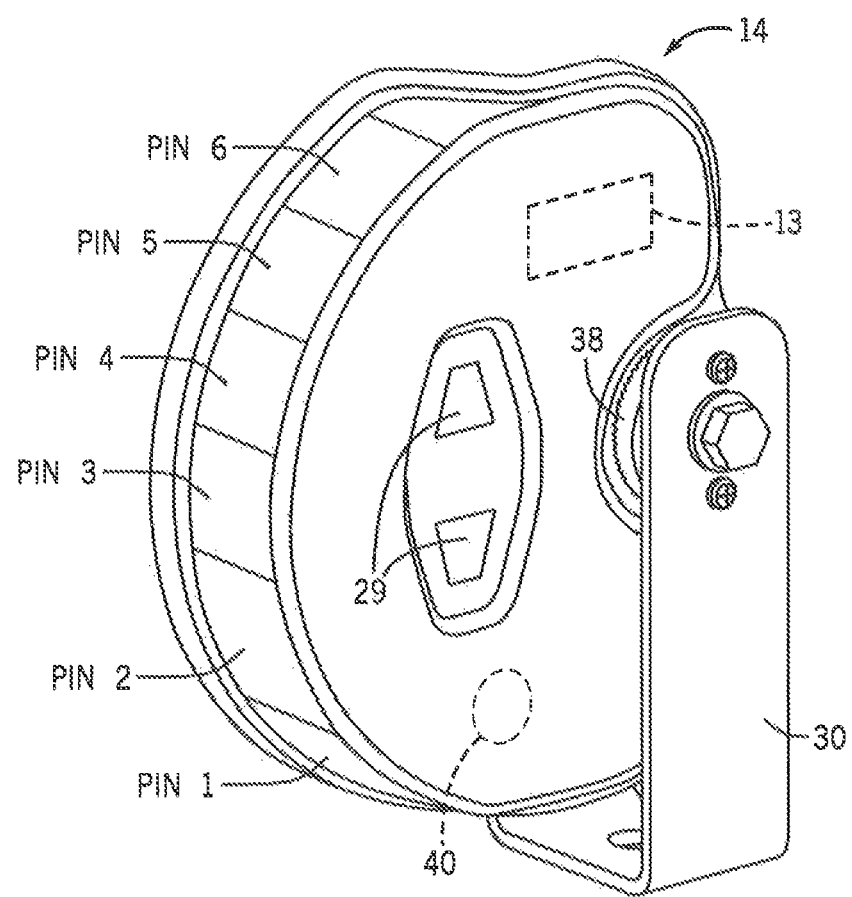
FIG. 13 is a view of a lighting system that can be rotated, and is shown in a first orientation.
Figure 14:
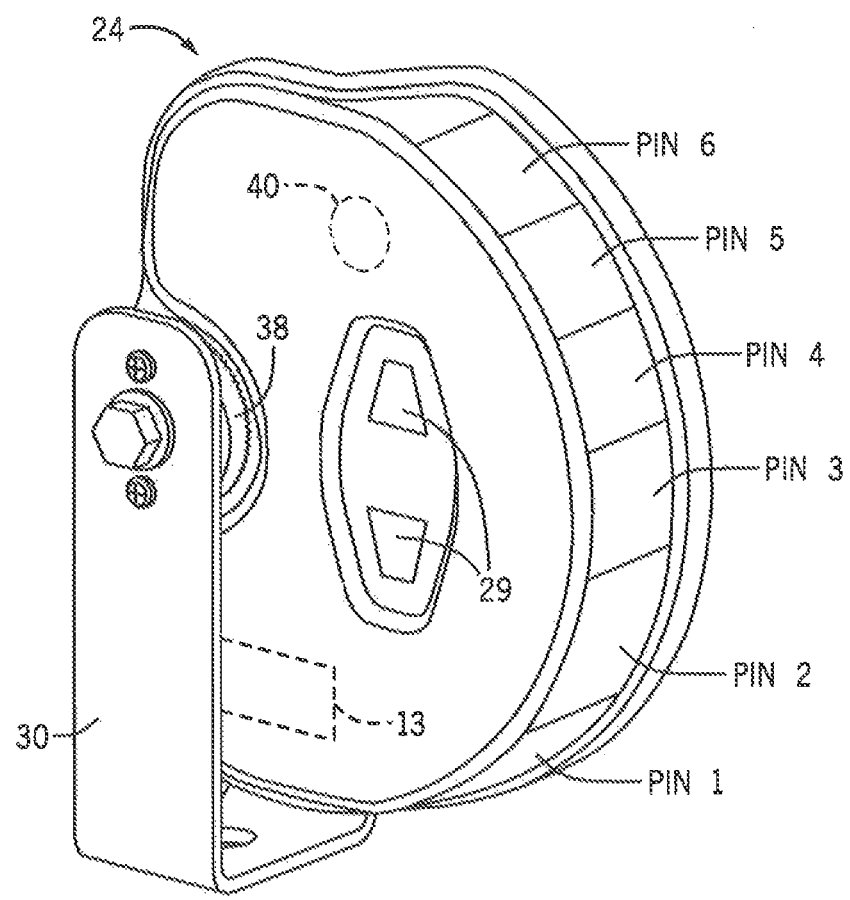
FIG. 14 is a view of the lighting system of FIG. 13 with the lighting system inverted.
Figure 15:
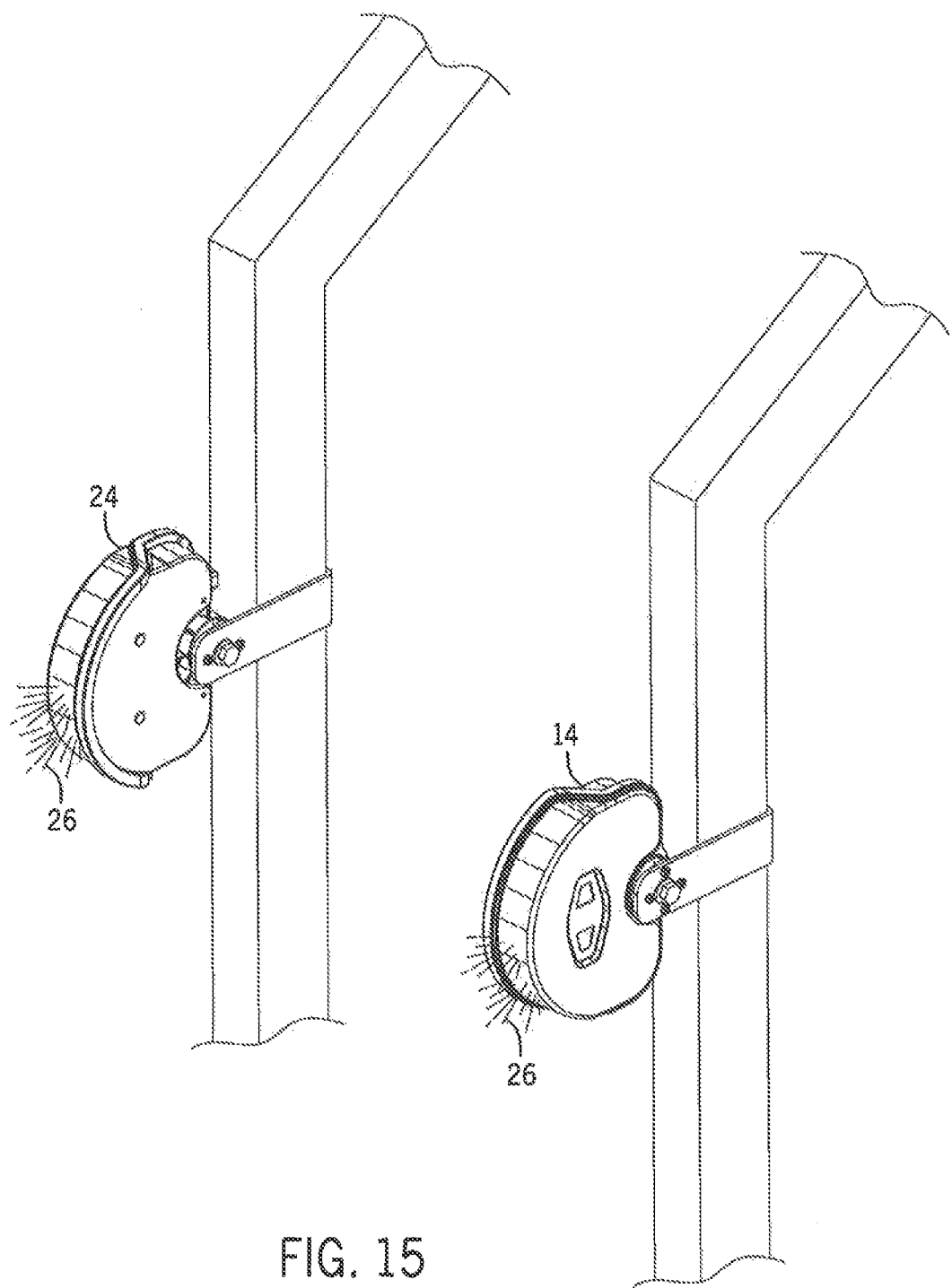
FIG. 15 is a view of a lighting system including a mater lamp and a slave lamp.

The hardware of the master lamp 14 and the slave lamp 24 can be similar or identical when assembled. The accelerometers 84, 584 in the master lamp 14 and slave lamp 24 can be used to determine the direction of the gravitational force on each lamp. FIG. 13 shows a master lamp 14 in a first orientation and FIG. 14 shows a slave lamp 24 in a rotated position, e.g., 180 degrees or more or less. When either of the master lamp 14 or slave lamp 24 is rotated, for example, as shown in FIG. 14, the accelerometer 84, 584 can report a negative value. The microprocessor 80, 580 in the master lamp 14 and slave lamp 24 can then determine if the master lamp 14 or slave lamp 24 is inverted or not, and assign each light source 20 a desired pin, e.g., pin 1-6, such that the master lamp 14 and slave lamp 24 can still synchronize to provide the same light pattern from each lamp. When the microprocessor 80, 580 determines whether the lamp 14, 24 is inverted or not, the microprocessor can assign the pins of the physical light source 20 to their respective designator in the firmware so that "light source 1" can always mean the physical light source closest to the ground. For example, if a light beam 26 as shown in FIG. 1 was desired, the master lamp 14 would energize the light sources 20 associated with pin 1 and pin 2, and the inverted slave lamp 24 would also energize the light sources 20 associated with pin 1 and pin 2. FIG. 15 shows a forklift application as a non-limiting example including a master lamp 14 and a slave lamp 24. As can be seen, the slave lamp is inverted from the master lamp 14, yet the pattern of the light beam 26 is the same from both the master lamp 14 and the slave lamp 24, i.e., light source 1 and light source 2 on both the master lamp and the slave lamp are illuminated to produce light beam 26.

Further, the microprocessor 80, 580 can adjust the function of the buttons 29 such that when the master lamp 14 or the slave lamp 24 are in one orientation, such as FIG. 13, the increase (or up) button 29 can adjust the light beam 26 upward, and when that same master lamp 14 or slave lamp 24 is inverted, such as in FIG. 14, the increase (or up) button 29 now can serve as the decrease (or down) button 29 to adjust the light beam 26 downward.

The override remote control 28 can make use of the wireless transceiver 60 used in the height module 50, the master lamp 14, and the slave lamp 24. The wireless transceiver 60 can broadcast the active state of at least one button 33 on the override remote control 28 as well as the unique electronic signature of the override remote control 28 when the at least one button 30 is pressed. This can be interpreted by the master lamp 14 to either increase the pattern by one bin or decrease the pattern by one bin, depending on the instructions received.

The override remote control 28 can allow the lamp pattern 26 to be controlled independently of the height module 50, and can also serve as a reset for the master lamp 14 algorithms when used in tandem with the height module 50. The master lamp 14 can re-calibrate its averaged value to reflect the desired pattern difference upon reception of a message from the override remote control 28 that indicates the height bin should be changed. All transmissions can be controlled by the wireless transceiver 32 upon the button 33 press.

In some embodiments, a manual control 46 could be similar to the illumination control 29 that are directly on the master lamp 14, but remotely located on the vehicle 12 (see FIG. 1), such as on the vehicle's control panel (not shown). The manual control 46 can be connected via wires or communicate wirelessly with the master lamp 14 and slave lamp 24, similar to the height module 50. In some embodiments, the manual control 46 can take the form of a rocker, toggle, or push button switch, or be integrated with a vehicle touch screen interface, or controlled with a joystick, or other mechanical device, as non-limiting examples. In some embodiments, the manual control 46 can function only to provide a simple lower-beam-only, to all light sources on, or to provide a smooth movement of illumination, as non-limiting examples.

Figure 16:
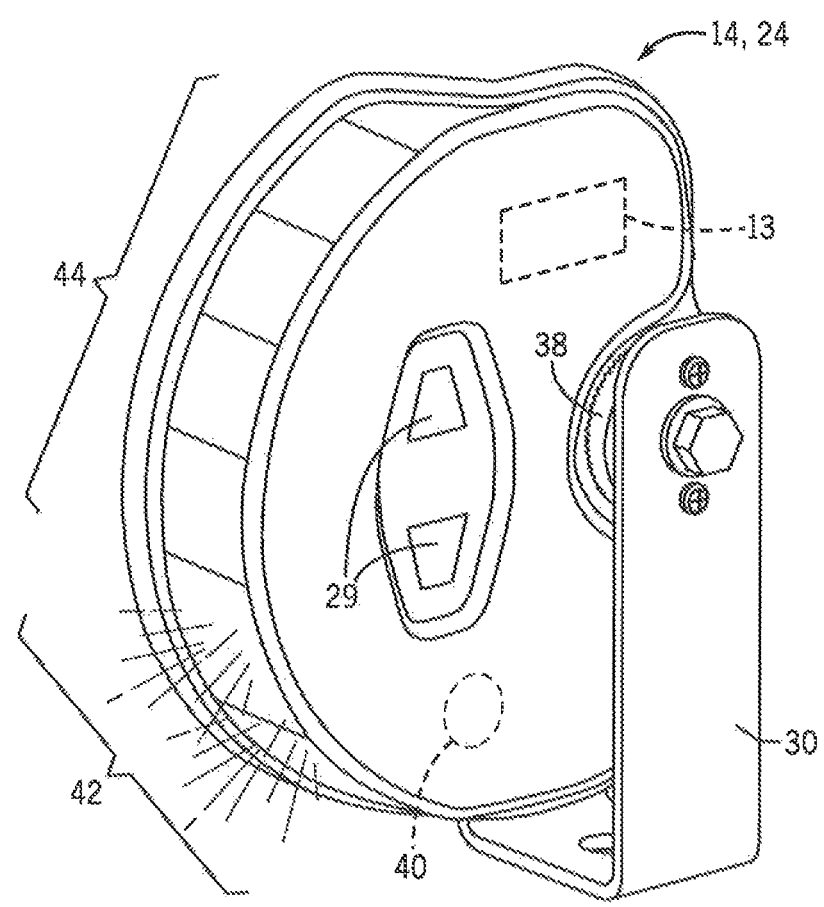
FIG. 16 is a view showing a lighting system to illuminate a work area, and showing a first portion turned on and a second portion turned off.

Referring to FIGS. 16 and 17, in some embodiments, the lamp 14 can be controlled to keep a first portion 42 on, such as a lower beam only function, while a second portion 44 can be turned off to reduce or avoid projecting illumination where the illumination is not desired. For example, the illumination from the master lamp 14 may not be desired where pedestrians or operators of other vehicles may be affected by the illumination. Then, when additional illumination is desired or required, the second portion 44 could be switched back on to provide illumination from any of the light sources 20 as described above, such as an all on function. In some embodiments, the switching could be manual, e.g., the manual control 46 or illumination control 29, or could be controlled by a sensor 40 on the lamp 14, 24, or on the height module 50, such as an ambient light sensor, e.g., a photosensor such as a photodiode or a phototransistor, for example.

As shown in the table of FIG. 17, an example pattern of six LED light sources 20 can be seen. One function can be the lower beam only function, where the output of LED 1 and LED 2 are both at 100 percent and the output from the remaining LEDs are at zero percent. Another function can be the all on function, where the output from all the LEDs are at 100 percent.

Within this specification embodiments have been described in a way which enables a clear and concise specification to be written, but it is intended and will be appreciated that embodiments may be variously combined or separated without parting from the invention. For example, it will be appreciated that all features described herein are applicable to all aspects of the invention described herein.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not be limited by the above disclosure.

The invention claimed is:

1. A method of illuminating a movable portion of a vehicle, the method comprising the steps of:

using a height module, determining a height data of the movable portion of the vehicle to be illuminated;

communicating the determined height data of the movable portion from the height module to a stationary lamp coupled to a part of the vehicle other than the movable portion through a wireless connection, the stationary lamp including a microprocessor and a plurality of light sources, each light source controllable to illuminate an area at a predetermined height; and illuminating at least one of the plurality of light sources to correspond to the determined height data to illuminate the movable portion.

2. The method of claim 1, further including sensing an increase or decrease of the height of the movable portion.

3. The method of claim 2, further including sensing the increase or decrease of the height of the movable portion using an altitude sensor.

4. The method of claim 1, further including determining a height bin corresponding to the determined height using the microprocessor, the height bin being a range of height values, the height values being the difference in height between an averaged height and a calculated height.

5. The method of claim 4, wherein the height bin changes with a change in the determined height.

6. The method of claim 4, further including determining the height bin corresponding to a user input height from an override remote control.

7. The method of claim 2, further including placing the microprocessor in a sleep mode when no increase or decrease is sensed.

8. The method of claim 7, further including waking the microprocessor from a sleep mode when the increase or decrease is sensed.

9. The method of claim 1, further including determining the height of the movable portion using a time-of-flight calculation.

10. A lighting system, the lighting system comprising:

a lamp to illuminate a work area, the lamp including a lamp controller a lamp wireless module, and a plurality of light sources, each light source being independently controllable by the lamp controller; and a height module to determine height data of the work area, the height module including a height module controller, a height module wireless module, a height module sensor to determine height data, and a height module sensor to determine movement of the height module, the height module to wirelessly communicate the height data to the lamp.

11. The system of claim 10, wherein the lamp further includes an ambient light sensor.

12. The system of claim 10, wherein one of the lamp and the height module further includes an ambient light sensor, the lamp controller to control each of the plurality of light sources based on data from the ambient light sensor.

13. The system of claim 12, wherein when a predetermined ambient light is sensed, the lamp controller to turn on a predetermined number of the plurality of light sources and to turn off the remainder of the plurality of light sources.

14. The system of claim 12, wherein the lamp includes a housing and an arcuate lens.

15. The system of claim 10, wherein the plurality of light sources comprises three or more light sources, each light source positioned at a different angle of inclination.

16. A method of illuminating a movable portion of a vehicle, the method comprising the steps of:

determining a height data of the movable portion of the vehicle to be illuminated;

communicating the determined height data of the movable portion to a stationary lamp coupled to a part of the vehicle other than the movable portion, the stationary lamp including three or more light sources, each light source positioned at a different angle of inclination and controllable to illuminate an area at a predetermined height; and illuminating at least one of the three or more light sources to correspond to the determined height data to illuminate the movable portion.

17. The method of claim 16, further including sensing an increase or decrease of the height of the movable portion.

18. The method of claim 17, further including sensing the increase or decrease of the height of the movable portion using an altitude sensor.

19. The method of claim 16, further including determining the height of the movable portion using a time-of-flight calculation.

20. The method of claim 16, wherein the vehicle is a forklift, and the movable portion of the forklift is a forklift carriage.

* * * * *